United States Patent
Nakao et al.

(10) Patent No.: US 8,926,743 B2
(45) Date of Patent: Jan. 6, 2015

(54) METAL PIGMENT, METHOD FOR PRODUCING THE SAME, AND WATER BASE METALLIC RESIN COMPOSITION INCLUDING THE SAME

(75) Inventors: Takayuki Nakao, Osaka (JP); Kazuya Fujimoto, Osaka (JP); Yoshiki Hashizume, Osaka (JP); Gaochao Lai, Osaka (JP); Kazuhiro Umehara, Tokyo (JP); Kenji Yamamoto, Tokyo (JP)

(73) Assignees: Toyo Aluminium Kabushiki Kaisha, Osaka-shi (JP); ADEKA Corporation, Tokyo (JP)

(*) Notice: Subject to any disclaimer, the term of this patent is extended or adjusted under 35 U.S.C. 154(b) by 480 days.

(21) Appl. No.: 13/382,501

(22) PCT Filed: Jul. 1, 2010

(86) PCT No.: PCT/JP2010/061251
§ 371 (c)(1),
(2), (4) Date: Jan. 5, 2012

(87) PCT Pub. No.: WO2011/004762
PCT Pub. Date: Jan. 13, 2011

(65) Prior Publication Data
US 2012/0129998 A1 May 24, 2012

(30) Foreign Application Priority Data
Jul. 6, 2009 (JP) ................................. 2009-159857

(51) Int. Cl.
*C09C 1/64* (2006.01)

(52) U.S. Cl.
CPC ............. *C09C 1/644* (2013.01); *C01P 2004/54* (2013.01); *C01P 2004/61* (2013.01)
USPC .......................... 106/284.02; 106/404; 556/27

(58) Field of Classification Search
USPC ................................ 106/284.02, 404; 556/27
See application file for complete search history.

(56) References Cited

U.S. PATENT DOCUMENTS

| | | | |
|---|---|---|---|
| 5,028,639 A | 7/1991 | Treutlein et al. | |
| 2003/0066457 A1 | 4/2003 | Hashizume et al. | |
| 2010/0083875 A1* | 4/2010 | Nakao ........................... | 106/404 |

FOREIGN PATENT DOCUMENTS

| | | |
|---|---|---|
| EP | 0 599 279 A2 | 6/1994 |
| JP | 61-174277 A | 8/1986 |
| JP | 1-119601 A | 5/1989 |
| JP | 1-501631 A | 6/1989 |
| JP | 2-52049 A | 2/1990 |
| JP | 2-107672 A | 4/1990 |
| JP | 4-318181 A | 11/1992 |
| JP | 7-118561 A | 5/1995 |
| JP | 8-209053 A | 8/1996 |
| JP | 9-328629 A | 12/1997 |
| JP | 2003-301131 A | 10/2003 |
| JP | 2004-189801 A | 7/2004 |
| WO | WO 02/31061 A1 | 4/2002 |
| WO | WO 2004/033563 A2 | 4/2004 |
| WO | WO 2008/139917 A1 | 11/2008 |

* cited by examiner

*Primary Examiner* — Sudhakar Katakam
*Assistant Examiner* — Pancham Bakshi
(74) *Attorney, Agent, or Firm* — Birch, Stewart, Kolasch & Birch, LLP

(57) ABSTRACT

The metal pigment of the present invention has a structure in which an organic carboxylic acid metal salt is adhered onto metal particles, and may also have a structure in which a first compound is adhered onto the metal particles, and the organic carboxylic acid metal salt is adhered onto the first compound.

7 Claims, No Drawings

METAL PIGMENT, METHOD FOR PRODUCING THE SAME, AND WATER BASE METALLIC RESIN COMPOSITION INCLUDING THE SAME

TECHNICAL FIELD

The present invention relates to a metal pigment used to provide a metallic feel, and particularly to a novel metal pigment suitable for a water base metallic paint, a water base metallic ink, or the like.

BACKGROUND ART

Generally, a metal pigment formed of metal particles of aluminum, copper, or the like and providing a metallic feel is normally blended into a metallic paint or a metallic ink. In recent years, in order to deal with environmental issues and the like, an aqueous solvent containing water is now being mainly used for blending into a paint or an ink, in place of an organic solvent that has been conventionally used for blending into a paint or an ink. If an untreated metal pigment is blended into an aqueous solvent, problems such as corrosion and the like of the metal pigment occur. Particularly when aluminum particles (aluminum pigment) are blended into an aqueous solvent as metal particles constituting the metal pigment, moisture reacts with aluminum to generate hydrogen gas. For this reason, when an aqueous composition such as an aqueous paint or the like containing an aluminum pigment is stored, there is a risk of explosion of the storage container. Many techniques have been developed in order to solve this problem.

For example, Japanese National Patent Publication No. 01-501631 (PTL 1) proposes a method wherein an aluminum pigment is treated with chromic acid. However, since the method uses a sexavalent chromium compound, its use is difficult in terms of environment and work.

Japanese Patent Laying-Open No. 04-318181 (PTL 2) proposes a method wherein an aluminum pigment is treated with a treating solution containing an oxidizing agent such as molybdic acid or the like, phosphoric acid ions, and alkaline earth metal ions. Japanese Patent Laying-Open No. 09-328629 (PTL 3) discloses an aluminum pigment treated with a polyacid peroxide. Since a coating derived from a polyacid peroxide is dense and has excellent corrosion resistance, an aluminum pigment chemically stable against a water base paint or a varnish for an aqueous ink can be obtained by forming the above coating on the surface of the aluminum pigment. Although this aluminum pigment has excellent chemical stability as described above, because of insufficient dispersibility of the aluminum pigment, there is a problem in that seediness occurs when preparing a coating film, or the resulting external appearance is poor.

Under such circumstances as described above, an aluminum pigment having a coating derived from polymolybdic acid peroxide formed thereon and containing an amine, and an aluminum pigment further provided with an adsorption layer of an organophosphorus compound on that coating, have been found to exhibit excellent water resistance, and also proposed (WO2002/031061 (PTL 4)).

The above-described aluminum pigment having excellent water resistance is obtained as follows: an amine, a solution in which metallic molybdenum is dissolved in hydrogen peroxide solution, and a hydrophilic solvent are added to an aluminum pigment composition containing an organic solvent, these components are mixed and stirred while heating to thereby form an inorganic coating on the aluminum surface, and an organophosphorus compound is added thereto as needed, to provide an aluminum pigment in paste form. This aluminum pigment in paste form can be widely used because it is particularly excellent in water resistance, unlikely to cause aggregation, and excellent in the characteristics of a coating film formed by blending this pigment. This method, however, suffered from difficulty in the control of steps and had danger in terms of work because it requires heating at the time of stirring and mixing for forming a coating derived from a solution in which metallic molybdenum is dissolved in highly reactive hydrogen peroxide solution (polymolybdic acid peroxide) on the aluminum surface, and requires an amine to suppress aggregation caused by a vigorous reaction between polymolybdic acid peroxide and aluminum.

As a method for solving the above-described problem, Japanese Patent Laying-Open No. 2003-301131 (PTL 5) discloses that similar water resistance can be achieved just by blending, in the preparation of a paint, an aluminum pigment dispersion obtained simply by stirring and mixing polymolybdic acid peroxide, an aluminum pigment, water, and a dispersant, without using an aluminium paste in which a coating derived from polymolybdic acid peroxide has been formed in advance on the aluminum surface by heating. This method, however, had a problem in that since polymolybdic acid peroxide is a strongly acidic solution, resin becomes unstable depending on the type and composition of the paint resin, causing aggregation of the aluminum pigment in the paint.

CITATION LIST

Patent Literature

PTL 1: Japanese National Patent Publication No. 01-501631
PTL 2: Japanese Patent Laying-Open No. 04-318181
PTL 3: Japanese Patent Laying-Open No. 09-328629
PTL 4: WO2002/031061
PTL 5: Japanese Patent Laying-Open No. 2003-301131

SUMMARY OF INVENTION

Technical Problem

An object of the present invention is to solve the above-described problems and provide a metal pigment having satisfactory chemical stability (that is, having a satisfactory effect of suppressing gas generation), in which aggregation during preparation and storage is prevented, a method for producing the same, and a water metallic resin composition containing the metal pigment.

Solution to Problem

As a result of various studies for overcoming the problems described above, the present inventors found that a metal pigment can be provided with a sufficient effect of suppressing gas generation just by stirring and mixing an organic carboxylic acid metal salt with the metal pigment, without conducting treatment of the metal pigment by the method having difficulty in the control of steps and having danger in terms of work, as in conventional examples, and consequently completed the present invention.

That is, the present invention is directed to a metal pigment in which an organic carboxylic acid metal salt (a metal salt of an organic carboxylic acid or an organic metal carboxylate) is adhered onto metal particles. Moreover, preferably, in such a metal pigment, a first compound is adhered onto the metal particles, and the organic carboxylic acid metal salt is adhered onto the first compound, and the first compound is at least one compound selected from the group consisting of a carboxylic acid, an ester, an amine, an amide, and an alcohol.

Here, the above metal particles are preferably aluminum particles, and a metal element constituting the above organic carboxylic acid metal salt is preferably copper.

The carboxylic acid constituting the above organic carboxylic acid metal salt is preferably at least one selected from carboxylic acids represented by a general formula (1) shown below:

wherein A represents a hydrocarbon group with 1 to 30 carbon atoms that may or may not have a substituent or substituents, and n represents a number of 1 to 4.

The metal element constituting the above organic carboxylic acid metal salt is preferably contained in an amount of 0.01 to 30 parts by mass per 100 parts by mass of the above metal particles, and the above organic carboxylic acid metal salt is preferably contained in an amount of 0.5 to 100 parts by mass per 100 parts by mass of the above metal particles.

The present invention is also directed to a water base metallic resin composition containing the above metal pigment.

Furthermore, the present invention is also directed to a method for producing the above metal pigment including the steps of adhering a first compound to the above metal particles, and mixing the metal particles to which the first compound is adhered and the above organic carboxylic acid metal salt, the first compound being at least one compound selected from the group consisting of a carboxylic acid, an ester, an amine, an amide, and an alcohol.

Advantageous Effects of Invention

The metal pigment of the present invention has satisfactory chemical stability (that is, has a satisfactory effect of suppressing gas generation), and has an excellent effect of preventing aggregation during preparation and storage. Further, the method for producing the metal pigment of the present invention has very simple steps and has the effect of achieving reduced production cost.

DESCRIPTION OF EMBODIMENTS

The present invention will hereinafter be described in more detail with reference to embodiments.

<Metal Pigment>

The metal pigment of the present invention has a structure in which an organic carboxylic acid metal salt is adhered onto metal particles. As used herein, the phrase "onto metal particles" may represent a state in which the organic carboxylic acid metal salt is adhered to the metal particles in direct contact therewith, or a state in which the organic carboxylic acid metal salt is adhered to the metal particles with another substance such as a first compound described below interposed therebetween (that is, a state in which the first compound is adhered onto the metal particles, and the organic carboxylic acid metal salt is adhered onto the first compound). Such an organic carboxylic acid metal salt may be adhered to the metal particles in a layered manner so as to completely cover the metal particles, or may be adhered onto the metal particles in an interspersed manner.

In the present invention, when the organic carboxylic acid metal salt is "adhered", it is assumed that the organic carboxylic acid metal salt is bonded to the metal particles or the first compound by way of action such as Van der Waals forces, however, a detailed mechanism thereof is unknown, and forms of binding are not limited to that described above.

By adhering the organic carboxylic acid metal salt onto the metal particles as described above, the present invention succeeded in extremely effectively preventing the metal particles from reacting with a solvent such as water or the like to generate hydrogen gas or the like, or undergo corrosion. Furthermore, the organic carboxylic acid metal salt as described above is adhered onto the metal particles by way of an easy operation as will be described below, and therefore, extremely high productivity is also achieved.

<Metal Particles>

The metal particles used in the present invention are not particularly limited, and any conventionally known metal particles having a metallic feel can be used. Examples of such metal particles include metal particles of aluminum, zinc, copper, bronze, nickel, titanium, stainless, and the like, as well as alloy particles containing these metals. Among these metal particles, aluminum particles are particularly suitable because they are excellent in metallic gloss, inexpensive, small in specific gravity, and hence easy to handle. Such metal particles also include particles provided with a metallic feel by forming a metal coat by plating or the like on the surface of inorganic compound particles (glass, mica, or ceramic particles of alumina, titania, or the like).

Aluminum particles particularly suitable as such metal particles will be described hereinafter.

Here, the aluminum particles used in the present invention may be composed of aluminum only, or may be composed of an aluminum-based alloy, and the purity of aluminum is not particularly limited.

Various shapes can be used as the shape of the aluminum particles used in the present invention, for example, a particulate shape, a plate shape, a mass shape, a flake (a scale) shape, and the like, however, a flake shape is preferred in order to provide a coating film with an excellent metallic feel and brightness.

The average particle size of the aluminum particles used in the present invention is not particularly limited, but is preferably 1 μm or more, and more preferably, in particular, 5 μm or more. Moreover, the average particle size is preferably 100 μm or less, and more preferably 30 μm or less.

Where the average particle size is 1 μm or more, handling in the production process is facilitated, and the particles tend to be unlikely to aggregate. Where the average particle size is 100 μm or less, the surface of the coating film when used as a paint can be prevented from roughening, thus realizing a preferred design. Further, sufficient water resistance, which is an effect of the present invention, can be obtained also where the average particle size of the aluminum particles used in the present invention is 20 μm or less. Generally, in the case of an average particle size of 20 μm or more, there is a technique for suppressing the generation of hydrogen gas in a paint composition; however, in the case of an average particle size of 20 μm or less, it is difficult to form a sufficient and uniform coating on the surface of the aluminum particles with a paint additive, and hence, a sufficient effect cannot be expected. In contrast, in the present invention, even when aluminum particles with a relatively small particle size are used, sufficient and uniform treatment can be applied thereto. The present invention is therefore effective particularly when aluminum particles with a small average particle size of 20 μm or less are used.

Moreover, the aluminum particles used in the present invention preferably have a shape factor (denoted herein as an "aspect ratio"), which is obtained by dividing an average particle size by an average thickness, of 5 or more, and more preferably, in particular, 15 or more. Moreover, this aspect ratio is preferably 1000 or less, and more preferably, in particular, 500 or less. Where the aspect ratio is 5 or more, particularly satisfactory brilliance is achieved, and where the aspect ratio is 1000 or less, high mechanical strength of the flakes is achieved, resulting in a particularly stable color tone. Here, the average particle size of the aluminum particles used in the present invention can be found by calculating an average volume thereof based on a particle size distribution measured by a known particle size distribution measurement method such as laser diffractometry, micromesh sieve, a Coulter counter method, or the like. The average thickness can be calculated based on the hiding capability and density of the aluminum particles. The aspect ratio is thus calculated by dividing the measured average particle size by the average thickness.

A grinding aid may be adhered to the surface of the aluminum particles used in the present invention. Examples of such a grinding aid may include, but are not particularly limited to, conventionally known grinding aids.

The method for obtaining the aluminum particles used in the present invention is not particularly limited, and may be a method in which aluminum powders as a raw material are ground or attrited using the grinding aid as mentioned above in, for example, a ball mill or an attritor mill in the presence of grinding media, thereby making aluminum particles, or a method in which aluminum-evaporated foil having aluminum evaporated on a film is crushed, thereby obtaining aluminum particles. A mineral oil with a high flashing point, such as mineral spirit, solvent naphtha, or the like, can be used as the grinding medium.

The foregoing description also applies to metal particles other than the aluminum particles.

<First Compound>

The first compound of the present invention is preferably at least one compound selected from the group consisting of a carboxylic acid, an ester, an amine, an amide, and an alcohol. Such a first compound is believed to attain the effect of promoting adhesion of the organic carboxylic acid metal salt onto the metal particles.

Here, such a first compound, which is adhered to the metal particles in contact therewith, may be adhered to the metal particles so as to cover the entire surface thereof, or may be adhered onto the metal particles in an interspersed manner. Moreover, when the first compound is "adhered" to the metal particles, it is assumed that the first compound is bonded to the metal particles by way of action such as Van der Waals forces or by way of hydrogen bonding or ionic bonding, however, a detailed mechanism thereof is unknown, and forms of binding are not limited to that described above.

Examples of the above-mentioned carboxylic acid may include, but are not particularly limited to, saturated aliphatic carboxylic acids, unsaturated aliphatic carboxylic acids, alicyclic dicarboxylic acids, aromatic carboxylic acids, oxocarboxylic acids, and the like. Among these, particularly suitable examples may include higher saturated aliphatic carboxylic acids, higher unsaturated aliphatic carboxylic acids, and the like. Examples of higher saturated aliphatic carboxylic acids may include stearic acid, isostearic acid, lauric acid, palmitic acid, myristic acid, and the like, and examples of higher unsaturated aliphatic carboxylic acids include oleic acid, linolic acid, linoleic acid, recinoleic acid, elaidic acid, zoomaric acid, gadoleic acid, erucic acid, and the like.

Examples of the above-mentioned ester may include, but are not particularly limited to, carboxylic acid esters, phosphoric acid esters, sulfuric acid esters, and the like. Among these, particularly suitable examples may include carboxylic acid esters, phosphoric acid esters, and the like. More specifically, methyl stearate, methyl laurate, stearyl phosphate, lauryl phosphate, tributyl phosphate, xylenyl diphenyl phosphate, and the like may be mentioned.

Examples of the above-mentioned amine may include, but are not particularly limited to, alkylamines (aliphatic amines), aromatic amines, polyamines, silylamines, and the like. Among these, particularly suitable examples may include alkylamines (aliphatic amines), aromatic amines, polyamines, and the like. More specifically, ethylamine, dimethylamine, trimethylamine, triethanolamine, stearylamine, oleylamine, aniline, 4-ethoxyaniline, 4-n-octylaniline, and the like may be mentioned.

Examples of the above-mentioned amide may include, but are not particularly limited to, carboxylic acid amides, sulfonic acid amides, phosphoric acid amides, and the like. Among these, particularly suitable examples include carboxylic acid amides. More specifically, oleamides, stearamides, lauramides, and the like may be mentioned.

Examples of the above-mentioned alcohol may include, but are not particularly limited to, lower alcohols, higher alcohols, aromatic alcohols, and the like. Among these, particularly suitable examples may include higher alcohols with 8 or more carbon atoms, benzyl alcohol, and the like. More specifically, capryl alcohol, lauryl alcohol, myristyl alcohol, cetyl alcohol, stearyl alcohol, oleyl alcohol, linolyl alcohol, phenyl methanol, 2-hydroxyphenyl methanol, (3,4-dihydroxyphenyl)methanol, benzene-1,2-dimethanol, and the like may be mentioned.

Such a first compound can be adhered onto the metal particles by mixing and stirring with the metal particles. Such a first compound can also be adhered onto the metal particles by being used as a grinding aid, which is used when obtaining metal particles by grinding or attriting metal powders as a raw material in a ball mill or the like, as in the case of obtaining aluminum particles described above. In this manner, the first compound is preferably adhered to the metal particles before the organic carboxylic acid metal salt described below is adhered to the metal particles.

In this respect, it is undesirable if the metal particles, the first compound, and the organic carboxylic acid metal salt are allowed to coexist during production to adhere them onto the metal particles. This is because, as stated above, the first compound is believed to have the effect of promoting adhesion of the organic carboxylic acid metal salt onto the metal particles, and hence, it is advantageous when the presence of the first compound on the metal particles precedes the presence of the organic carboxylic acid metal salt.

<Organic Carboxylic Acid Metal Salt>

The organic carboxylic acid metal salt (the metal salt of the organic carboxylic acid or the organic metal carboxylate) of the present invention is adhered onto the metal particles. As already described above, such an organic carboxylic acid metal salt may be adhered to the metal particles so as to cover the entire surface thereof in a layered manner, or may be adhered thereto in an interspersed manner, rather than in a layered manner, so long as the effects of the present invention can be attained. The organic carboxylic acid metal salt used in the present invention will be described below.

<Metal Element Constituting Organic Carboxylic Acid Metal Salt>

Examples of metal elements constituting the organic carboxylic acid metal salt may include, but are not particularly limited to, metals belonging to groups 1 to 15 in periods 2 to 6 of the periodic table. More specifically, examples may include K, Ca, Sc, Ti, V, Cr, Mn, Fe, Co, Ni, Cu, Zn, Ga, Ge, As, Rb, Sr, Y, Zr, Nb, Mo, Tc, Ru, Rh, Pd, Ag, Cd, In, Sn, Sb, Cs, Ba, Hf, Ta, W, Re, Os, Ir, Pt, Au, Hg, Tl, Pb, Bi, La, Ce, Pr, Nd, Pm, Sm, Eu, Gd, Tb, Dy, Ho, Er, Tm, Yb, Lu, and the like. In addition to these metal elements, examples may include Li, Be, Na, Mg, Al, Si, and the like. Among these metal elements, Cu (copper) is particularly preferred in that methods for synthesizing various organic carboxylic acid metal salts are widely known, and excellent adhesion onto the metal particles can be achieved.

In the organic carboxylic acid metal salt of the present invention, the number of carboxyl groups bonded to a single atom of the metal element as described above is not particularly limited, and one carboxyl group or two or more carboxyl groups may be bonded thereto.

<Carboxylic Acid Constituting Organic Carboxylic Acid Metal Salt>

The carboxylic acid constituting the organic carboxylic acid metal salt (also referred to as the "organic carboxylic acid) is not particularly limited, and may be any conventionally known carboxylic acid, but is preferably, for example, at least one selected from carboxylic acids represented by general formula (1) shown below. Although a carboxyl group (—COOH) is included in general formula (1), needless to say, in the organic carboxylic acid metal salt, the elemental hydrogen of this carboxyl group is replaced with the metal element as described above.

$$A\text{---}[COOH]_n \qquad (1)$$

wherein A represents a hydrocarbon group with 1 to 30 carbon atoms that may or may not have a substituent, and n represents a number of 1 to 4.

Here, examples of the above substituent include a hydroxyl group, an alkoxyl group, an acyl group, a nitro group, a mercapto group, an amino group, a sulfone group, a thiol group, and the like.

Examples of such carboxylic acids represented by general formula (1) above may include saturated fatty acids, unsaturated fatty acids, aromatic carboxylic acids, other special fatty acids, and the like.

More specifically, examples of monovalent (n=1 in general formula (1) above) saturated fatty acids (saturated aliphatic carboxylic acids) may include propionic acid, butanoic acid (butyric acid), pentanoic acid (valeric acid), isopentanoic acid (isovaleric acid), hexanoic acid (caproic acid), heptanoic acid, isoheptanoic acid, octanoic acid (caprylic acid), 2-ethylhexanoic acid, isooctanoic acid, nonanoic acid (pelargonic acid), isononanoic acid, decanoic acid (capric acid), isodecanoic acid, undecanoic acid, isoundecanoic acid, dodecanoic acid (lauric acid), isododecanoic acid, tridecanoic acid, isotridecanoic acid, tetradecanoic acid (myristic acid), isotetradecanoic acid, hexadecanoic acid (palmitic acid), isohexadecanoic acid, octadecanoic acid (stearic acid), isostearic acid, icosanoic acid (arachin acid), isoicosanoic acid, docosanoic acid (behenic acid), isodocosanoic acid, tetracosanoic acid (lignoceric acid), isotetracosanoic acid, hexacosanoic acid (cerotic acid), isohexacosanoic acid, octacosanoic acid (montanic acid), isooctacosanoic acid, triacontanoic acid (melissic acid), isotriacontanoic acid, and the like.

Examples of monovalent unsaturated fatty acids (unsaturated aliphatic carboxylic acids) may include propenoic acid, butenoic acid, pentenoic acid, hexenoic acid, heptenoic acid, octenoic acid, nonenoic acid, decenoic acid, undecenoic acid, dodecenoic acid, tridecenoic acid, tetradecenoic acid, hexadecenoic acid (palmitoyl acid), octadecenoic acid (oleic acid, vaccenic acid), octadecanedienoic acid (linolic acid), octadecanetrienoic acid (linolenic acid, eleostearic acid), icosenoic acid, icosanedienoic acid, icosanetrienoic acid, icosanetetraenoic acid (arachidonic acid), docosenoic acid, tetracosenic acid, hexacosenoic acid, octacosenoic acid, triacontenoic acid, tariric acid, stearolic acid, crepenynic acid, xymenynic acid, and the like.

Examples of monovalent aromatic carboxylic acids may include benzoic acid, methylbenzoic acid, dimethylbenzoic acid, trimethylbenzoic acid, isopropylbenzoic acid, phenylacetic acid, phenylpropanoic acid, phenylacrylic acid, hydroxybenzoic acid, hydroxymethylbenzoic acid, methoxybenzoic acid, dihydroxybenzoic acid, hydroxymethoxybenzoic acid, dimethoxybenzoic acid, dihydroxymethylbenzoic acid, trihydroxybenzoic acid, trimethoxybenzoic acid, hydroxyphenylacetic acid, methoxyphenyl acetic acid, dihydroxyphenylacetic acid, hydroxymethoxyphenylacetic acid, dimethoxyphenylacetic acid, carboxymethylacetic acid, hydroxyphenylpropanoic acid, dihydroxyphenylpropanoic acid, hydroxymethoxyphenylpropanoic acid, diphenylacetic acid, hydroxydiphenylacetic acid, biphenylcarboxylic acid, naphthalenecarboxylic acid, and the like.

Examples of monovalent, other special fatty acids (special aliphatic carboxylic acids) may include fatty acids with triple bonds, such as tariric acid, stearolic acid, crepenynic acid, xymenynic acid, and the like; alicyclic fatty acids, such as malvalic acid, sterculic acid, hydnocarpic acid, chaulmoogric acid, gorlic acid, and the like; hydroxyfatty acids, such as sabinic acid, ipurolic acid, jalapinolic acid, juniperic acid, ambrettolic acid, aleuritic acid, recinoleic acid, kamlolenic acid, licanic acid, ferron, cerebronic acid, and the like; etc.

Further, a mixed carboxylic acid obtained by hydrolyzing a natural fat, a mixed carboxylic acid such as a naphthenic acid or the like produced from petroleum or the like, or a carboxylic acid obtained by purifying such a mixed carboxylic acid may also be used. Examples of natural fats may include vegetable fats such as flaxseed oil, perilla oil, oiticica oil, olive oil, cacao butter, kapok oil, white mustard oil, sesame oil, rice bran oil, safflower oil, shea nut oil, china wood oil, soybean oil, tea seed oil, camellia oil, corn oil, rapeseed oil, palm oil, palm kernel oil, castor oil, sunflower oil, cotton seed oil, palm oil, Japan wax, arachis oil, and the like; animal fats such as horse fat, beef tallow, neatsfoot oil, butter, lard, goat tallow, mutton tallow, milk fat, fish oil, whale oil, and the like; etc.

Examples of divalent (n=2 in general formula (1) above) fatty acids (aliphatic carboxylic acids) may include methanedicarboxylic acid, ethanedicarboxylic acid, propanedicarboxylic acid, butanedicarboxylic acid, pentanedicarboxylic acid, hexanedicarboxylic acid, heptanedicarboxylic acid, octanedicarboxylic acid, nonanedicarboxylic acid, decanedicarboxylic acid, undecanedicarboxylic acid, dodecanedicarboxylic acid, tridecanedicarboxylic acid, tetradecanedicarboxylic acid, pentadecanedicarboxylic acid, benzenedicarboxylic acid, biphenyldicarboxylic acid, naphthalenedicarboxylic acid, maleic acid, fumaric acid, hydroxysuccinic acid, and the like.

Examples of trivalent (n=3 in general formula (1) above) carboxylic acids may include benzenetricarboxylic acid, biphenyltricarboxylic acid, naphthalenetricarboxylic acid, and the like.

Examples of tetravalent (n=4 in general formula (1) above) carboxylic acids may include benzenetetracarboxylic acid, biphenyltetracarboxylic acid, naphthalenetetracarboxylic acid, and the like.

Among these carboxylic acids, monovalent or divalent aliphatic carboxylic acids are preferred, and monovalent aliphatic carboxylic acids are more preferred. Moreover, among monovalent aliphatic carboxylic acids, aliphatic carboxylic acids with 6 to 20 carbon atoms are preferred, saturated aliphatic carboxylic acids and unsaturated aliphatic carboxylic acids with 6 to 20 carbon atoms are more preferred, and saturated aliphatic carboxylic acids with 6 to 20 carbon atoms are particularly preferred.

<Method for Synthesizing Organic Carboxylic Acid Metal Salt>

The organic carboxylic acid metal salt of the present invention can be obtained by reacting an organic carboxylic acid with a metal element-containing compound such as a metal oxide, a metal chloride, a metal sulfate salt, a metal nitrate salt, a metal carbonate salt, or the like (copper(I) oxide, copper(II) oxide, zirconium oxide, zinc sulfate, calcium chloride, or the like). For example, when the metal element is copper, the organic carboxylic acid and an elemental copper-containing compound may be mixed, so as to give an amount of 0.1 to 1 mole, and preferably 0.1 to 0.5 mole, of the elemental copper-containing compound on the basis of copper atoms, per mole of carboxyl groups contained in the organic carboxylic acid, and reacted for 1 to 24 hours at 20 to 200° C. If any unreacted organic carboxylic acid remains, it may be purified by recrystallization or the like, and if any unreacted elemental copper-containing compound remains, it may be removed by filtration or the like. Further, if any other by-product is formed, such by-product may be diluted with a solvent or the like and then purified by, for example, washing with water. It is noted that the method for producing the organic carboxylic acid metal salt is not limited to these production and purification methods.

<Form of Organic Carboxylic Acid Metal Salt (External Shape)>

The organic carboxylic acid metal salt of the present invention may be used in a powder (solid) form, or may be used in the form of a solution or a dispersion diluted with a solvent or the like. All of these forms are commercially available, and such a commercially available product can be used as purchased. Examples of the above-mentioned solvent include alcohols such as methanol, ethanol, propanol, isopropanol, butanol, and the like; natural fats such as vegetable oils, animal oils, and the like; mineral oils such as naphthene oil, paraffin oil, mineral spirit, and the like; synthetic oils such as benzene, toluene, hexane, ethyl acetate, butyl acetate, poly-α-olefins, ethylene-α-olefin copolymers, polybutene, alkylbenzene, alkyl naphthalene, polyalkylene glycol, polyphenylether, alkylated diphenyl ethers, polyol esters, dibasic acid esters, carbonic acid esters, GTL (Gas to Liquids), and the like; etc.

<Content of Metal Element Constituting Organic Carboxylic Acid Metal Salt>

In the metal pigment of the present invention, the metal element constituting the organic carboxylic acid metal salt is preferably contained in an amount from 0.01 to 30 parts by mass, and more preferably, in particular, from 0.5 to 20 parts by mass, per 100 parts by mass of the metal particles. Where the metal element content is 0.01 part by mass or more, the metal pigment exhibits particularly satisfactory chemical stability, such that, for example, when aluminum particles are blended as metal particles into a water base paint, the problem of generation of hydrogen gas as a result of reaction between water and aluminum in the water base paint can be reduced. Where the metal element content is 30 parts by mass or less, aggregation of the metal pigment due to elution of the organic carboxylic acid metal salt in the water base paint can be prevented, thus achieving a metal pigment providing a coating film with particularly satisfactory design and hiding capability.

The metal element content described above can be quantified by plasma emission spectrometry using "iCAP6000" manufactured by Thermo Fisher Scientific K. K., by using a calibration curve that uses a standard solution containing the metal element, with respect to a solution extracted by an alkali dissolution extraction method.

<Content of Organic Carboxylic Acid Metal Salt in Metal Pigment>

In the metal pigment of the present invention, the organic carboxylic acid metal salt is preferably contained in an amount from 0.5 to 100 parts by mass, and more preferably, in particular, from 1 to 50 parts by mass, per 100 parts by mass of the metal particles. Where the content is 0.5 part by mass or more, when a metal pigment (aluminum pigment) obtained using aluminum particles as metal particles is blended into a water base paint, the problem of generation of hydrogen gas as a result of reaction between water and aluminum during storage of the water base paint can be reduced. Further, when the content is 100 parts by mass or less, the problem of lowered temporal stability due to elution of the organic carboxylic acid metal salt in the water base paint can be reduced.

<Other Structures>

In the present invention, various additional coatings can be formed on the surface of the metal particles to which the organic carboxylic acid metal salt is adhered. For example, a coating with an organophosphorus compound (including a polymer) may be formed, or a coating with a resin may be formed, for the purpose of improving the acid resistance, alkali resistance, adhesion, and the like of a coating film containing the metal pigment of the present invention. Such a coating may also be formed by laminating two or more coatings.

Meanwhile, prior to or after adhering the organic carboxylic acid metal salt onto the metal particles, a single layer or two or more layers of, for example, a coupling agent containing silicon and/or titanium or the like may be further formed between the metal particles and the organic carboxylic acid metal salt or on the organic carboxylic acid metal salt, so long as the effects of the present invention are not impaired.

<Coating with Organophosphorus Compound>

Examples of the organophosphorus compound constituting such a coating include acidic phosphoric acid esters, polyoxyethylene alkylphenol phosphoric acid, phosphoric acid esters obtained by reaction of epoxy or acrylic compounds with phosphoric acid, acrylic or methacrylic phosphoric acid esters, and the like. These organophosphorus compounds include polymers.

Particularly preferred organophosphorus compounds are acidic phosphoric acid esters derived from aliphatic monovalent or aliphatic polyhydric alcohols with 4 to 18 carbon atoms, and examples thereof include mixtures of those having structures as shown below:

orthophosphoric acid monoesters of aliphatic alcohols: $R-O-PO(OH)_2$; and orthophosphoric acid diesters of aliphatic alcohols: $(R-O)_2PO(OH)$ wherein R each independently represents an alkyl moiety with 4 to 18 carbon atoms that may or may not contain a substituent (the carbon chain constituting the alkyl moiety may be branched).

As an organophosphorus compound that is a polymer, particularly an organophosphorus compound having a number average molecular weight from 400 to 10000 is preferred. In the case of a number average molecular weight of 400 or more, when forming a coating film using a resin composition containing the metal pigment of the present invention and a paint resin, the advantages of improved adhesion between the metal pigment and the paint resin, and a coating film with satisfactory physical properties can be achieved. A number average molecular weight of 10000 or less is suitable in that the storage stability of the metal pigment is not lowered. A particularly suitable number average molecular weight is 500 to 700.

Such an organophosphorus compound can coat the metal particles in an amount of 50 to 100 parts by mass per 100 parts by mass of the metal particles.

<Coating with Resin>

Examples of the resin constituting the coating with a resin (hereinafter also referred to as the "resin coating") include homopolymers or copolymers synthesized from one monomer or two or more monomers including at least any of a reactive monomer having a carboxyl group and/or a phosphoric acid group, a trifunctional or higher polyfunctional acrylic ester monomer, and a polymerizable monomer having a benzene nucleus. Where a resin coating is formed, when forming a coating film using a resin composition containing the metal pigment of the present invention and a paint resin, the effects of improved adhesion between the metal pigment and the paint resin, and a coating film with satisfactory physical properties can be attained. Further, the formation of such a resin coating also attains the effect of improved chemical resistance of the coating film.

Such a resin coating can coat the metal particles in an amount of 50 to 100 parts by mass per 100 parts by mass of the metal particles.

<Method for Producing Metal Pigment>

The method for producing the metal pigment of the present invention is not particularly limited, however, the metal pigment can be produced by an easy operation including, for example, the steps of adhering the above-described first compound to the above-described metal particles, and mixing the metal particles to which the first compound is adhered and the above-described organic carboxylic acid metal salt. Such a suitable method for producing the metal pigment of the present invention can include any other steps as described below, so long as it includes the above-described two steps.

A production method using aluminum particles having a flake shape as metal particles will hereinafter be described. First, aluminum powders used as a raw material of such aluminum particles are converted into flakes in an organic solvent using a grinding apparatus such as a ball mill or the like with grinding media, thereby preparing aluminum particles having a flake shape (the step of preparing aluminum particles). While the step of preparing aluminum particles can be performed as an independent step, it preferably also serves as a step of adhering the above-described first compound (also referred to as the step of adhering the first compound).

That is, when the aluminum powders as a raw material are converted into flakes in an organic solvent using the grinding apparatus as mentioned above, the above-mentioned first compound is allowed to coexist as a grinding aid with grinding media, thereby allowing the first compound to be adhered to the aluminum particles having a flake shape used as metal particles (the step of adhering the first compound). This attains the effect of efficiently converting the raw material aluminum powders into flakes while adhering the first compound onto the aluminum particles, and also improving gloss by suppressing unwanted oxidation of the obtained aluminum particles.

Here, the amount of the first compound added in the above-described step of adhering the first compound is preferably from 0.1 to 20 parts by mass, and more preferably from 0.5 to 10 parts by mass, per 100 parts by mass of the raw material aluminum powders (that is, the metal particles). If the amount of the first compound added is less than 0.1 part by mass, aggregation of the aluminum particles may occur, leading to the possibility of lowered surface gloss of the aluminum particles. On the other hand, if the amount of the first compound added exceeds 20 parts by mass, physical properties of the resulting material when used as a paint may be lowered.

Further, the organic solvent used in the step of adhering the first compound described above is not particularly limited, and a conventionally known organic solvent can be used. For example, a hydrocarbon-based solvent such as mineral spirit, solvent naphtha, or the like, or an alcohol-based solvent, an ether-based solvent, an ester-based solvent, or the like can be used. Generally, a high-boiling hydrocarbon-based solvent can be suitably used in view of safety issues such as inflammability involved with the solvent at the time of grinding.

Next, a large amount of solvent is added to the aluminum particles obtained as above to which the first compound is adhered, thereby giving slurry in which the aluminum particles are dispersed in the solvent. Then, by adding dropwise the organic carboxylic acid metal salt to the slurry, a step of mixing the aluminum particles to which the first compound is adhered (metal particles) and the organic carboxylic acid metal salt (also referred to as the step of adhering the organic carboxylic acid metal salt) was conducted. Although the case where slurry is formed has been described above by way of example, the above-described step may also be conducted by reducing the amount of the solvent added to thereby give a paste state. Alternatively, the organic carboxylic acid metal salt may be added dropwise to the aluminum particles to which the first compound in a powder state is adhered, and these components may be kneaded in a kneader mixer or the like. By way of this step of adhering the organic carboxylic acid metal salt, the organic carboxylic acid metal salt is adhered onto the metal particles, thus obtaining the metal pigment of the present invention.

Here, the above-mentioned organic carboxylic acid metal salt may be added in the original state (that is, in a powder state) to the aluminum particles, or may be added in a state diluted with a solvent or a mineral oil. In order to give a uniform mixture of the aluminum particles and the organic carboxylic acid metal salt, it is more preferred that the organic carboxylic acid metal salt be added in a state diluted in advance with a solvent or a mineral oil. In this case, examples of the solvent or mineral oil used for dilution include alcohols such as methanol, isopropyl alcohol, and the like, cellosolves such as propylene glycol monomethyl ether and the like, hydrocarbon solvents such as hexane, octane, isooctane, benzene, toluene, xylene, and the like, industrial gasoline such as mineral spirit, solvent naphtha, and the like, mineral oils, and the like.

Meanwhile, the solvent for making the aluminum particles into a slurry or paste state in the above-described step of adhering the organic carboxylic acid metal salt may be either a hydrophilic solvent or a hydrophobic solvent. Examples of the hydrophilic solvent include alcohols such as methanol, ethanol, propanol, butanol, isopropanol, and the like, cellosolves such as ethylene glycol monoethyl ether, ethylene glycol monobutyl ether, diethylene glycol monoethyl ether, diethylene glycol monobutyl ether, propylene glycol monoethyl ether, propylene glycol monomethyl ether, dipropylene glycol monomethyl ether, and the like, glycols such as propylene glycol, polyoxyethylene glycol, polyoxypropylene glycol, ethylene propylene glycol, and the like, etc. Examples of the hydrophobic solvent include mineral spirit, solvent naphtha, toluene, xylene, and the like. These solvents can be used alone or as a mixture of two or more.

In the above-described step of adhering the organic carboxylic acid metal salt, the aluminum particles to which the first compound is adhered and the organic carboxylic acid metal salt are preferably mixed and stirred for 10 minutes to 72 hours, and preferably for 20 minutes to 48 hours, at a temperature of 10° C. to 150° C., and preferably 20° C. to 140° C. When a large amount of solvent is included in this step, the aluminum particles may be made into a paste or powder state by removing the solvent as appropriate to a desired amount by a filtration step or the like, as described previously.

Furthermore, the metal pigment (aluminum pigment) of the present invention obtained as above in which the organic carboxylic acid metal salt is adhered onto the aluminum particles may be subjected to aging for 3 hours to 3 months, and preferably for 6 hours to 2 months, at 30° C. to 120° C., and preferably at 40° C. to 110° C. This achieves firm adhesion of the organic carboxylic acid metal salt to the surface of the aluminum particles.

Meanwhile, an organophosphorus compound (in particular, a polymer having a number average molecular weight of 400 to 10000) may be added after adhering the organic carboxylic acid metal salt to the aluminum particles as above, whereby a coating composed of the organophosphorus compound can be formed on the outermost surface. Alternatively, a resin coating can be formed on the outermost surface, as described above. By laminating each of these layers alone, or by laminating both of these layers, it is possible to improve various characteristics of the coating film, such as acid resistance, alkali resistance, adhesion, and the like. When both layers are laminated, either layer may be formed on the outermost surface, however, the resin coating is preferably formed on the outermost surface. This is because the resin coating has good compatibility with the resin content in the coating film, and direct contact of the resins with each other is expected to achieve further improvement in performance in various ways.

For the purpose of improving the dispersibility of the metal pigment in the paint or the affinity of the metal pigment for resin, or for the purpose of further improving the corrosion resistance, a surfactant (polyoxyethylene alkyl phenol ether, polyoxyethylenealkylamine, alkylbenzene sulfonate salt, or the like) or other corrosion inhibitor (a dimer acid or the like) may further be adhered to the outermost surface of the metal pigment of the present invention.

Although the production method using aluminum particles as metal particles has been described in detail above, the metal pigment can be produced by the same production method even when other metal particles are used.

<Water Base Metallic Resin Composition>

The present invention is also directed to a water base metallic resin composition containing the metal pigment as described above.

A principal object of the metal pigment of the present invention is to be used by being blended into a resin composition such as a paint, an ink, or the like. Examples of such a resin composition encompass a paint and a coating film resulting therefrom, as well as an ink and printed matter resulting therefrom.

Examples of the paint and ink in which the metal pigment of the present invention is used include those of both organic solvent-type and water base-type, however, because of its characteristics as described above, the metal pigment of the present invention is particularly suitably used in a water base metallic paint or a water base metallic ink. Therefore, a water base metallic resin composition (including a coating film and printed matter) may be mentioned as a particularly suitable example of the above-mentioned resin composition. The blending amount of the metal pigment when used in such a water base metallic resin composition is suitably 0.1 to 30% by mass with respect to the total mass of the resin composition.

Here, the paint or ink as the resin composition is composed of, for example, components as listed below.

1) A resin: an acrylic resin, an alkyd resin, a polyester resin, a polyurethane resin, a polyvinyl acetate resin, a nitrocellulose resin, or a fluororesin.

2) A pigment: in addition to the metal pigment according to the present invention, a coloring pigment, an extender pigment, a dye, or the like as listed below can also be used together;

phthalocyanine, quinacridone, isoindolinone, perylene, azo lake, iron oxide, chrome yellow, carbon black, titanium oxide, pearl mica, or the like.

3) An additive: water, an organic solvent, a surfactant, a curing agent, an UV absorbent, an antistatic agent, a thickener, or the like.

The coating film as the water base metallic resin composition of the present invention may be formed on an undercoat layer or an intermediate layer by electrodeposition coating. Alternatively, a topcoat layer may also be formed on the coating film of the present invention.

EXAMPLES

The present invention will be described in more detail with reference to examples; however, the present invention is not limited thereto. In the present examples, various physical properties were measured by the following methods.

<Average Thickness of Metal Particles>

The average thickness of the metal particles was calculated according to the following equation.

Average thickness (μm)=(1/density of the metal particles)×(1/water surface diffusion area of the metal particles)

The water surface diffusion area of the metal particles can be measured according to section 8.6 in JIS K5906.

<Average Particle Size of Metal Particles>

The average particle size was found from a particle size distribution measured by laser diffractometry, using "Microtrac HRA9320-X100" manufactured by Nikkiso Co., Ltd.

<Method for Measuring Content of Metal Element Constituting Organic Carboxylic Acid Metal Salt>

(1) The content of the metal element in a diluted solution of the organic carboxylic acid metal salt was measured using "iCAP6000" manufactured by Thermo Fisher Scientific K. K., to find the metal element content in the solution.

(2) The content of the metal element in the metal pigment of the present invention powdered after adhering the organic carboxylic acid metal salt was measured using "iCAP6000" manufactured by Thermo Fisher Scientific K. K., to find the metal element content in the metal pigment.

Example 1

In the present example, aluminum particles were used as metal particles. First, a paste of the aluminum particles was prepared as follows. One-thousand grams of aluminum powders as a raw material of the aluminum particles, 100 g of oleic acid as a first compound, and 5 L of an organic solvent (mineral spirit) were added to a ball mill with grinding media. The ball mill was then operated under the conditions of a temperature of 20° C. and a treatment time of 15 hours, thereby converting the aluminum powders into flakes, and also adhering the first compound onto the aluminum particles converted into flakes (the step of adhering the first compound). Adjustment of the solids content was subsequently performed by solid-liquid separation, thereby giving 1100 g of a paste of the aluminum particles to which the first compound was adhered (solids content: 70% by mass, mean particle size of the aluminum particles: 10 μm, average thickness: 0.19 μm, aspect ratio: 10.5, water surface diffusion area: 2.0 m$^2$/g) (this paste is hereinafter referred to as a "paste A").

Next, 100 g of "paste A" of the aluminum particles was weighed into a kneader mixer. Further, copper naphthenate as an organic carboxylic acid metal salt was diluted with trademark "Shellsol A100" (an isomeric mixture of trimethylbenzene, manufactured by Shell Chemicals Japan Ltd.), thereby giving 4.0 g of a diluted solution (copper content: 6.4% by mass). The diluted solution was further dissolved in 6.0 g of mineral spirit, and the solution was also added to the above-mentioned kneader mixer.

The kneader mixer was then operated under the condition of a rotation speed of 30 rpm to thereby mix (knead) the aluminum particles to which the first compound was adhered and the organic carboxylic acid metal salt for 30 minutes at room temperature (25° C.), thus giving an aluminum pigment in a paste state as a metal pigment of the present invention (the step of adhering the organic carboxylic acid metal salt).

The aluminum pigment obtained in a paste state was washed with acetone and then dried, thereby giving a powdered aluminum pigment. As a result of quantification of the copper content of the aluminum pigment (that is, the content of the metal element constituting the organic carboxylic acid metal salt) using a plasma emission spectrometry device ("iCAP6000" mentioned above), the copper content was found to be 0.24 part by mass per 100 parts by mass of the aluminum particles.

Example 2

One-hundred grams of "paste A" of the aluminum particles used in Example 1 were weighed into a kneader mixer. Further, copper isostearate as an organic carboxylic acid metal salt was diluted with trademark "Shellsol A100" (mentioned above), thereby giving 5.0 g of a diluted solution (copper content: 4.8% by mass). The diluted solution was further dissolved in 5.0 g of mineral spirit, and the solution was also added to the above-mentioned kneader mixer.

The kneader mixer was then operated under the condition of a rotation speed of 30 rpm to thereby mix (knead) the aluminum particles to which the first compound was adhered and the organic carboxylic acid metal salt for 30 minutes at room temperature (25° C.), thus giving an aluminum pigment in a paste state as a metal pigment of the present invention.

The aluminum pigment obtained in a paste state was washed with acetone and then dried, thereby giving a powdered aluminum pigment. As a result of quantification of the copper content of the aluminum pigment (that is, the content of the metal element constituting the organic carboxylic acid metal salt) using a plasma emission spectrometry device ("iCAP6000" mentioned above), the copper content was found to be 0.20 part by mass per 100 parts by mass of the aluminum particles.

Example 3

One-hundred grams of "paste A" of the aluminum particles used in Example 1 were weighed into a kneader mixer. Further, zirconium naphthenate as an organic carboxylic acid metal salt was diluted with trademark "Shellsol A100" (mentioned above), thereby giving 2.0 g of a diluted solution (zirconium content: 11.7% by mass). The diluted solution was further dissolved in 8.0 g of mineral spirit, and the solution was also added to the above-mentioned kneader mixer.

The kneader mixer was then operated under the condition of a rotation speed of 30 rpm to thereby mix (knead) the aluminum particles to which the first compound was adhered and the organic carboxylic acid metal salt for 30 minutes at room temperature (25° C.), thus giving an aluminum pigment in a paste state as a metal pigment of the present invention.

The aluminum pigment obtained in a paste state was washed with acetone and then dried, thereby giving a powdered aluminum pigment. As a result of quantification of the zirconium content of the aluminum pigment (that is, the content of the metal element constituting the organic carboxylic acid metal salt) using a plasma emission spectrometry device ("iCAP6000" mentioned above), the zirconium content was found to be 0.30 part by mass per 100 parts by mass of the aluminum particles.

Comparative Example 1

One-hundred grams of "paste A" of the aluminum particles used in Example 1 were weighed into a kneader mixer. Further, 0.4 g of naphthenic acid was dissolved in 12.0 g of mineral spirit, and the solution was also added to the above-mentioned kneader mixer.

The kneader mixer was then operated under the condition of a rotation speed of 30 rpm to thereby mix (knead) the aluminum particles to which the first compound was adhered and the naphthenic acid for 30 minutes at room temperature (25° C.), thus giving an aluminum pigment in a paste state in which the naphthenic acid was adhered to the surface of the aluminum particles (corresponding to a case where naphthenic acid was used instead of the organic carboxylic acid metal salt of the present invention).

Comparative Example 2

One-hundred grams of "paste A" of the aluminum particles used in Example 1 were weighed into a kneader mixer. Further, 0.4 g of isostearic acid was dissolved in 12.0 g of mineral spirit, and the solution was also added to the above-mentioned kneader mixer.

The kneader mixer was then operated under the condition of a rotation speed of 30 rpm to thereby mix (knead) the aluminum particles to which the first compound was adhered and the isostearic acid for 30 minutes at room temperature (25° C.), thus giving an aluminum pigment in a paste state in which the isostearic acid was adhered to the surface of the aluminum particles (corresponding to a case where isostearic acid was used instead of the organic carboxylic acid metal salt of the present invention).

Comparative Example 3

One-hundred grams of "paste A" of the aluminum particles used in Example 1 were weighed into a kneader mixer. Further, 0.08 g of metal molybdenum powders was gradually added to 0.5 g of a hydrogen peroxide solution containing 30% hydrogen peroxide, and a diluted solution obtained by diluting this mixture with 17.5 g of isopropyl alcohol was also added to the above-mentioned kneader mixer.

The kneader mixer was then operated under the condition of a rotation speed of 30 rpm to thereby mix (knead) the aluminum particles to which the first compound was adhered and the diluted solution for 30 minutes at room temperature (25° C.), thus giving an aluminum pigment in a paste state in which the metal molybdenum was adhered to the surface of the aluminum particles (corresponding to the aluminum pigment described in PTL 3).

<Preparation of Water Base Metallic Resin Composition>

A water base metallic resin composition as a paint was prepared according to the composition and method described below, using each of the aluminum pigments obtained in Examples 1 to 3 as metal pigments of the present invention and each of the aluminum pigments for comparison obtained in Comparative Examples 1 to 3.

A "paint A" was prepared by mixing 3.1 g of each aluminum pigment (solids content), 4.2 g of ethylene glycol monoethyl ether, and 0.3 g of a dispersant (trademark "DISPARLON AQ330", manufactured by Kusumoto Chemicals, Ltd.).

A "paint B" was prepared by mixing 59.6 g of a copolymerized acrylic resin (trademark "SETAQUA6802", manufactured by nuplex), 8.61 g of a urethane resin A (trademark "Bayhydrol PT241", manufactured by Bayer Material Science), 35.2 g of a urethane resin B (trademark "Bayhydrol XP2621", manufactured by Bayer Material Science), 4.0 g of a melamine resin (trademark "Cymel327", manufactured by Mitsui Cytec Co., Ltd.), 0.6 g of a leveling agent (DISPARLON, trademark "AQ7120", manufactured by Kusumoto Chemicals, Ltd.), 11.1 g of ethylene glycol monoethyl ether, and 26.0 g of deionized water.

A "paint C" was prepared by mixing 2.1 g of a viscosity modifier (trademark "DISPARLON AQ600", manufactured by Kusumoto Chemicals, Ltd.), 0.8 g of ethylene glycol monoethyl ether, and 14.9 g of deionized water.

Paints A, B, and C were then mixed, and the pH of the mixture was adjusted to 8.0 to 8.5 with 10% aqueous solution of dimethylethanolamine, thus preparing a water base metallic resin composition.

<Evaluation of Gas Generation>

One-hundred grams of each of the above-described water base metallic resin compositions were taken as a sample, which was then stored for 72 hours in a heat-retention water bath kept at 40° C., and a cumulative amount of generated hydrogen gas was measured during that time. Evaluation was made such that the smaller this cumulative amount of generated hydrogen gas is, the better the storage stability is. The results are shown in Table 1.

<Evaluation Regarding Aggregation of Metal Pigment>

Each of the water base metallic resin compositions after being subjected to the evaluation of gas generation described above was applied onto a PET film with a bar coater (standard #50), thereby preparing a coating film. The external appearance of this coating film was then visually evaluated. An anti-aggregating property of the metal pigment in the paint was evaluated by examining the presence or absence of aggregates in the coating film. As an evaluation method, evaluation was made in accordance with the following criteria, and the results are shown in the "Aggregation" column of Table 1.

"A": No aggregate was observed.

"B": A large number of aggregates were observed.

TABLE 1

|  | Ex. 1 | Ex. 2 | Ex. 3 | Comp. Ex. 1 | Comp. Ex. 2 | Comp. Ex. 3 |
| --- | --- | --- | --- | --- | --- | --- |
| Cumulative Amount (ml) of Generated Hydrogen Gas | 0 | 0 | 0 | 5.6 | 7.2 | 0 |
| Aggregation | A | A | A | A | A | B |

As is clear from Table 1, as compared with the metal pigments of the comparative examples, the metal pigments of the present invention were confirmed to exhibit an excellent effect of having satisfactory chemical stability (that is, having a satisfactory effect of suppressing gas generation) and preventing aggregation during preparation and storage.

While the embodiments and examples of the present invention have been described as above, it is originally contemplated to combine features of each of the foregoing embodiments and examples, as appropriate.

It should be understood that the embodiments and examples disclosed herein are illustrative and non-restrictive in every respect. The scope of the present invention is defined by the terms of the claims, rather than the description above, and is intended to include any modifications within the scope and meaning equivalent to the terms of the claims.

The invention claimed is:

1. A metal pigment used in a water base metallic resin composition comprising:
   metal particles;
   a first compound adhered onto the metal particles; and
   an organic carboxylic acid metal salt adhered onto the first compound,
   said first compound being at least one compound selected from the group consisting of a carboxylic acid, an ester, an amine, an amide, and an alcohol, and
   a metal element constituting said organic carboxylic acid metal salt being copper.

2. The metal pigment according to claim 1, wherein said metal particles are aluminum particles.

3. The metal pigment according to claim 1, wherein a carboxylic acid constituting said organic carboxylic acid metal salt is at least one selected from carboxylic acids represented by a general formula (1) shown below:

$$A{\text{---}}[COOH]_n \qquad (1)$$

where A represents a hydrocarbon group with 1 to 30 carbon atoms that may or may not have a substituent, and n represents a number of 1 to 4.

4. The metal pigment according to claim 1, wherein the metal element constituting said organic carboxylic acid metal salt is contained in an amount of 0.01 to 30 parts by mass per 100 parts by mass of said metal particles.

5. The metal pigment according to claim 1, wherein said organic carboxylic acid metal salt is contained in an amount of 0.5 to 100 parts by mass per 100 parts by mass of said metal particles.

6. A water base metallic resin composition comprising the metal pigment according to claim 1.

7. A method for producing the metal pigment according to claim 1, comprising the steps of:
   adhering a first compound to said metal particles; and
   mixing the metal particles to which said first compound is adhered and said organic carboxylic acid metal salt,
   said first compound being at least one compound selected from the group consisting of a carboxylic acid, an ester, an amine, an amide, and an alcohol.

* * * * *